United States Patent [19]
Frederiksen

[11] Patent Number: 4,743,959
[45] Date of Patent: May 10, 1988

[54] HIGH RESOLUTION COLOR VIDEO IMAGE ACQUISITION AND COMPRESSION SYSTEM

[76] Inventor: Jeffrey E. Frederiksen, 603 West Haven Dr., Arlington Heights, Ill. 60005

[21] Appl. No.: 908,316

[22] Filed: Sep. 17, 1986

[51] Int. Cl.$^4$ .......................... H04N 7/12; H04N 11/06
[52] U.S. Cl. ........................................ 358/11; 358/12; 358/133; 358/96
[58] Field of Search ...................... 358/133, 11, 13, 12, 358/96, 140, 22, 21 R, 280, 283, 284; 382/51, 56, 52; 364/518, 521; 379/53

[56] References Cited

U.S. PATENT DOCUMENTS

| | | | |
|---|---|---|---|
| 4,597,005 | 6/1986 | Baleshta et al. | 358/11 X |
| 4,628,344 | 12/1986 | Glenn | 358/133 X |
| 4,654,484 | 3/1987 | Reiffel et al. | 358/133 X |

Primary Examiner—Howard W. Britton
Assistant Examiner—Victor R. Kostak
Attorney, Agent, or Firm—Stephen G. Rudisill

[57] ABSTRACT

A digital color video image digitizing and communication process comprises the steps of dividing digital data representing the overall picture information for a video image into sets of data representing shape and color information for blocks of the image with the color information including the major colors for the corresponding block and the variation in shades or hues of the colors within the block, separating, according to a predefined encoding procedure, each of the data sets into a first group of data representing the major colors constituting the block and a second group of data comprising the remaining data in the data sets and representing the shades of the major colors within the block, storing the second group of data in a color table, processing the second group of data and transmitting the first group of data and the processed second group of data to a decoder capable of processing received data according to a predefined decoding procedure, processing the received first data group to display the encoded image in its major colors, and combining the first group of data with the selected data from the second data group and processing the combined data to display the encoded video image with the variations in shades of the major colors. The digitizing process is adapted to operate in a plurality of modes incorporating different encoding/decoding procedures and provides high resolution digitizing of color images while at the same time providing the capability of controlling the degree of compression at the encoding end as well as the decoding end, thereby making it suited to a variety of color image digitizing applications.

28 Claims, 7 Drawing Sheets

HIGH RESOLUTION COLOR VIDEO IMAGE ACQUISITION AND COMPRESSION SYSTEM

FIELD OF THE INVENTION

The present invention relates to a color video image acquisition and compression system for picture archiving and communication systems (PACS).

BACKGROUND OF THE INVENTION

The accurate representation, storage and transmission of color video images entails the processing of enormous amounts of data. In order to provide good resolution, i.e., to establish proper distinction between closely spaced variations within the original image, the system must be capable of representing the original image with as many pixels as possible. Further, in order to distinguish between closely related hues of color within the image, the system must be able to identify a multitude of colors which in turn requires increased information to be stored for each pixel. Since the large amount of data involved in normal digital color processing directly contributes to increased expense due to unwieldy processing, enlarged storage needs and increased transmission costs, a variety of encoding systems are prevalent in the art.

Such systems are based on various data compression techniques which are aimed at relatively efficient coding of picture material and provide the opportunity for significantly decreasing transmission costs and storage requirements for a given picture quality. A major disadvantage of such conventional compression and coding techniques is that they entail complex computational schemes at the encoding end as well as the decoding end.

A variety of block coding techniques have also been suggested for information compression in the coding of still pictures. For example, Mitsuya et al. U.S. Pat. No. 4,238,768 discloses a method by which a frame of grey scaled pictures is divided into a plurality of blocks, with the picture elements of each block being separated into grey components and resolution components on the basis of the statistical property of the luminance levels of picture elements within the block before the actual coding begins. A similar technique is also disclosed in Mitsuya et al. U.S. Pat. No. 4,205,341 wherein the size of each block is changed in accordance with the property of the picture and the portion corresponding to the block. Various adaptations of such information compression coding techniques to color pictures are disclosed by Mitsuya et al. U.S. Pat. No. 4,319,267 which teaches the separation of the color picture into three discrete color component pictures, which are subsequently divided into blocks by three discrete block coding means and encoded. However, these methods generally involve complex color encoding algorithms, complicated and expensive decoding means, and do not provide conveniently controllable multiple levels of compression which permit the user a choice of encoding best suited to his application.

More advanced block encoding and decoding processes for color images, using color map memories, are described in Campbell et al. U.S. Pat. No. 4,580,134.

SUMMARY OF THE INVENTION

A primary object of this invention is to provide a color PACS which has the capability of improved compression-encoding and expansion-decoding.

A related object of one particular aspect of this invention is to provide a high-resolution color image encoding and decoding system which serves as easy, rapid, and economical means for transfer of color images as well as documents in video teleconferencing and similar applications.

A further object of this invention is to provide a color encoding and decoding system which is particularly applicable to the conversion of photographic still color images to video and to the image analysis of color images using video cameras.

Another object of this invention is to provide a high resolution color PACS for efficiently encoding color images represented by a variety of formats such as NTSC, PAL or ##?SECAM and permitting their display in real time.

Yet another object of this invention is to provide such a color PACS with conveniently controllable multiple levels of compression permitting the user a choice of degrees of compression best suited to a particular application.

A further object of this invention is to provide such a high resolution real time color image encoding and decoding system with significantly reduced image processing, data transmission and storage costs.

Many of the foregoing objects are realized, according to the system of this invention, by an encoding method in which a color image represented by its luminance and chrominance components (or R,G,B data) is sectored into a plurality of blocks which are separately encoded. The resulting coded data is stored in the form of a compressed file which includes the actual coded information along with a specially formatted Rigid, Sparse, Virtual and Partial (RSVP) color table. The encoding procedure involves the compression of representative data extracted from the color image by processing it on the basis of a predefined data compression sequence. The encoded data can be separated so that a predesignated portion of the data represents the information needed to reproduce a mosaic which possesses sufficient clarity to allow the user to preview the actual image. The rest of the pertinent data is stored within the RSVP color table before transmission to the decoder. At the decoder end, the encoded data is used as an index into the color table to extract the remaining color image data and to upgrade the clarity and resolution of the color picture to a desired level. The color encoding system provides convenient control over the degree of resolution available by controlling the extent of compression of data at the encoding end and its decompression at the decoder end.

Other objects and advantages of the present invention will become apparent from the following detailed description when taken in conjunction with the accompanying drawings.

DETAILED DESCRIPTION OF THE PREFERRED EMBODIMENT

While the invention will be described in connection with a particular preferred embodiment, it will be understood that it is not intended to limit the invention to that particular embodiment. On the contrary, it is intended to cover all alternatives, modifications and equivalents as will be included within the spirit and scope of the invention as defined by the appended claims.

Figure 1:
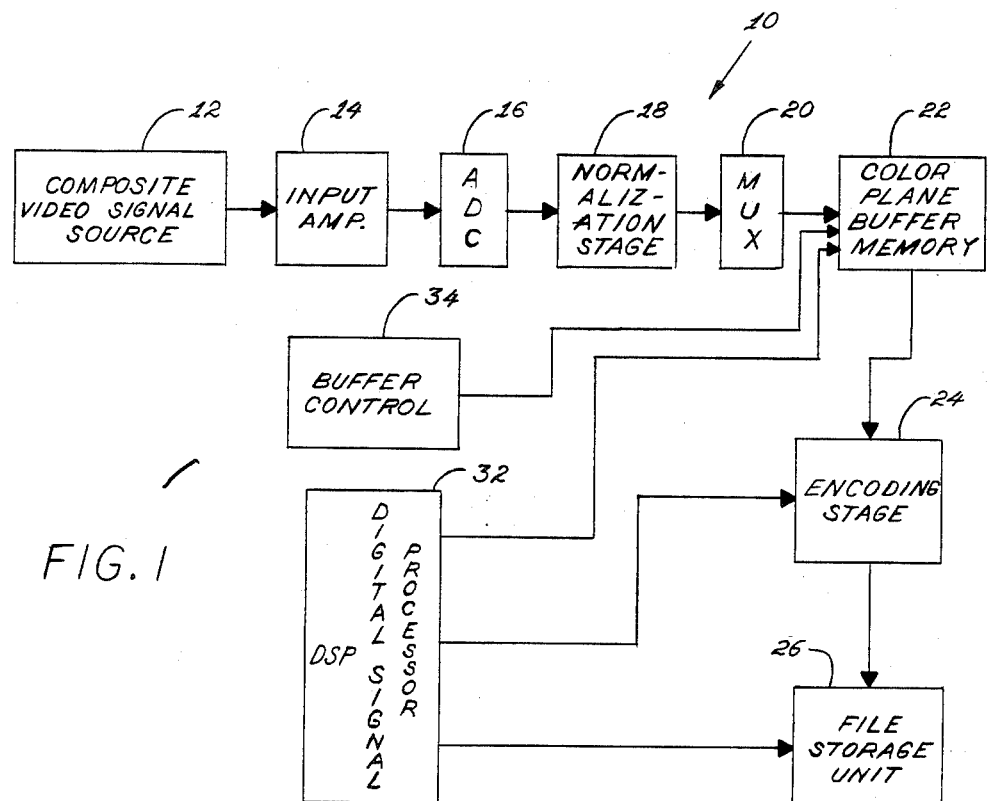
FIG. 1 is a block diagram of a typical encoding system for use with the present invention.

FIG. 1 is a block diagram representation of a coding/decoding system for use with the present invention. The system includes a composite video signal source 12 capable of providing a composite signal which represents in a selected standardized format the color image to be encoded. The COding/DECoding (CODEC) scheme of the invention is independent of the type of format (NTSC, PAL, or ##?SECAM) used to represent the original color image to be encoded in composite signal form. For the purpose of this discussion, the composite video signal source 12 will be assumed to supply a video signal in the NTSC standard format.

The output of the video source 12 is passed through an input amplifier 14 which raises the composite signal to a convenient level from which an analog-to-digital converter 16 translates the analog composite signal into a corresponding digital output signal. The output of the A-to-D conversion stage, constitutes the digital signals representing the luminance and the color difference or chrominance components of the NTSC composite signal. These digital signals are passed through a normalization stage 18 whose function is described below.

FIG. 1 represents the outline of a basic system for implementing the CODEC process and is not limited to any particular hardware implementation. For instance, the CODEC process may be based on commercially available sets of VLSI circuits designed for digital signal processing in TV receivers, such as the "Digit 2000 System" available from Intermetal Semiconductors (ITT) of West Germany, which provides a programmable digital TV system with minimal external component count suitable for the NTSC, PAL and ##?SECAM standards. But a direct implementation of the CODEC process by using the ITT hardware is not practical without proper normalizing using appropriate input and output hardware. More specifically, the input portion of the ITT system has inherent to it certain degrees of disassociation of the luminance component Y and the related chrominance components (R−Y) and (B−Y) within a field of display. First, the chrominance components for even lines in a field are displaced by a margin of two pixels with respect to the corresponding components in the odd lines. Although this is accounted for in the ITT system by a synchronizing pulse which controls chrominance sampling, a checker-boarding effect is produced which can lead to encoding problems unless proper alignment of the luminance and chrominance components is performed.

In addition, a delay disassociation is also inherent to the output portion of the ITT system because the luminance components are delayed in relation to the corresponding chrominance components. In effect, subsequent to the sampling procedure, the luminance and chrominance components that are processed out by the ITT system are not associated with the same area of the picture image.

In a hardware implementation, the normalization stage 18 takes care of such problems by ensuring proper synchronization of the luminance and chrominance values for a given picture area, which is a prerequisite for efficient encoding of color information. For example, in the ITT case, the problem is solved at the encoding end by sampling the chrominance components only for the lines in the field in which they are in proper alignment. These sampled components are then temporarily stored in memory and used as the chrominance components for the lines in the field where the actual chrominance components are displaced. Since the displaced chrominance components themselves are not used in any way and are instead substituted by the chrominance components sampled at the preceding line, this process results in an extra level of averaging of the chrominance components for every other line of the image being sampled but produces insignificant loss of color information since the system actually performs the averaging of the chrominance components for every four lines.

In addition, an appropriate delay (typically 4 pixels) is introduced in the sampling of the chrominance components to ensure that the sampled chrominance components for a picture area are realigned with the luminance components so as to sample and store together in memory all information associated with the same area of the picture image. A similar normalization stage (not shown) also exists at the decoder end and functions to provide a corresponding inverse delay of the sampled luminance components and a properly timed synchronizing signal to ensure that the decoder properly aligns and displays the chrominance and luminance components.

The specific operations of the input and output normalization stages, if any, are dependent on the particular hardware being used, and it is sufficient to state that these stages are capable of aligning and synchronizing the processed composite signals so that the luminance and chrominance values associated with a given block of the color image are properly aligned in preparation for the subsequent encoding and decoding operations.

Returning now to FIG. 1, the normalized digital signals representing the luminance and chrominance data for the color image are supplied to a conventional multiplexer 20 which stores the luminance components for selected areas or blocks of the image along with their associated chrominance components in designated areas within a color plane buffer memory 22. The digital data stored in the buffer memory 22 can be conveniently extracted from the buffer memory and subjected to the encoding process of this invention at an encoding stage 24.

All the data that is generated at the encoder stage is then transferred to a storage file unit 26, from which all or part of the compressed data is transmitted to a receiver/decoder 28. The decoder processes the received compressed data to reproduce the original color image over a conventional display device 30. The formatting of the buffer memory to ensure proper storage of the digital data representing the image, the subsequent encoding of the digitized picture information according to a predefined encoding process, and the proper transfer and storage of the encoded information are collectively accomplished under the control of a conventional high speed Digital Signal Processor (DSP) 32. A buffer control system 34 serves as a further control and external interface for controlling the organization of the buffer memory and the distribution of picture information within it.

Figure 2A:
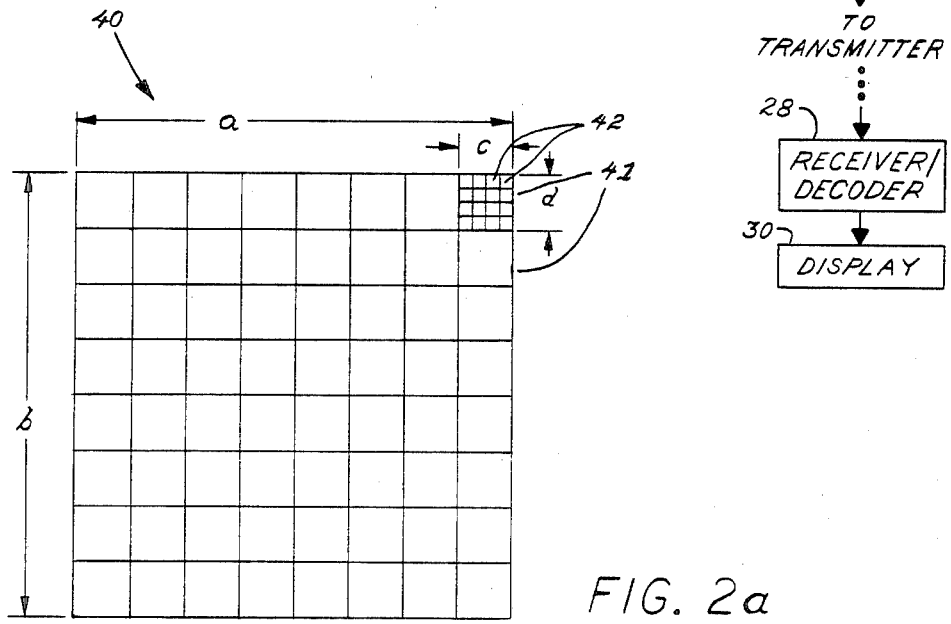
FIG. 2a illustrates the sectoring of the color image into discrete blocks for the encoding scheme.
Figure 2:
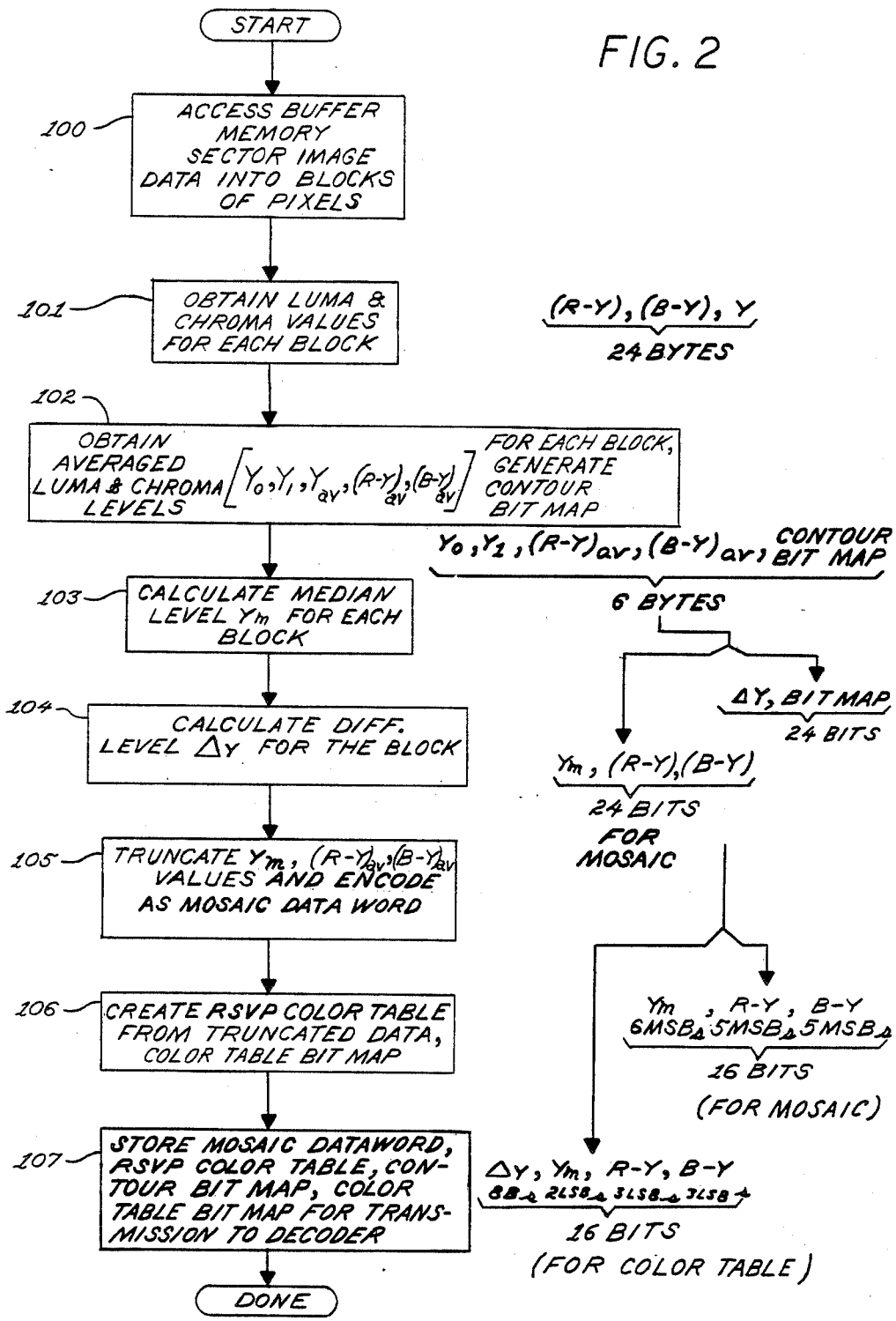
FIG. 2 is a simplified flowchart type illustration of the sequence involved in achieving the compression of data according to the encoding scheme of this invention.

Referring to FIG. 2, there is shown a flow chart of the basic sequence of operations involved in achieving the compression of data according to this invention. The encoding process begins at step 100 where the buffer memory 22 of FIG. 1 is accessed for processing the digitized picture information stored there. The sampled and digitized color picture data including the luminance and chrominance components is sectored into individual blocks, each block comprising an array of luminance and chrominance values which in turn correspond to an array of pixels included within a corresponding block in the original image. In the preferred embodiment, each such sectored block in the color image comprises information representing a 4×4 array of pixels as shown in FIG. 2a, which illustrates how the color picture or image 40 is divided into discrete picture areas or blocks. The blocks are then encoded as digital data which can be stored and/or transmitted and then decoded in order to generate a video display of the original picture 40.

As shown in FIG. 2a, the original color picture 40 is divided into a matrix a×b of blocks 41, and each block 41 is divided into a matrix c×d of pixels 42 which in this case is a 4×4 matrix of pixels. However, blocks of different sizes, such as those using 2×2 or 8×8 arrays could also be used.

In FIG. 2, the process of extracting required information from the data corresponding to each of the sectored blocks and encoding it using a small number of bits is described with reference to a single block and is sequentially applied to encode all blocks of the color image.

At step 101, the data representing a selected block of the color image is accessed in order to retrieve from it the luminance components Y for each of the plurality of pixels in the block. Four pairs of chrominance components representing the color information for the block are also extracted at this stage. The luminance and chrominance components are derived from the luminance signal Y and the color difference signals (R−Y) and (B−Y) demodulated from the original composite NTSC signal representing the color image being encoded.

The process by which the derivation of these components from the NTSC signal occurs is characteristic of the hardware system being employed. The ITT system, for instance, demodulates the NTSC component signal to provide the luminance component for each pixel in the image and a pair of chrominance components (R−Y) and (B−Y) for every four horizontal pixels in the image. Each of these components has a higher and lower order value represented by the upper and lower nibbles, respectively, of their two-nibble value. When such demodulated data is sectored at step 101, chrominance information for a block is represented by four pairs of chrominance components, each pair consisting of a (R−Y) component and a (B−Y) component. The chrominance components are then averaged so that a block is finally represented by two pairs of chrominance components, a pair for each of the odd and even fields of a picture frame, containing all the chrominance information for the block with each pair having a single (R−Y) and (B−Y) chrominance value.

At the end of step 101 the luminance and chrominance components stored within the buffer memory are available in the form of 8-bit values for pixels within the designated block. In order to represent the complete luminance and chrominance information for the pixels within the block, 16 bytes of data, representing a 4×4 block of color information, are required to accommodate the luminance components, and 4 bytes of data are needed for the (R−Y) and (B−Y) chrominance components.

At step 102, a first level of data compression is obtained by calculating averaged values of the luminance and chrominance component values for the selected block. A value Yav is first calculated which is equal to the average luminance value of all the pixels in the block. In the preferred embodiment Yav is the average value of the luminance components of the 16 pixels within a 4×4 block. Next, a count is taken of all pixels within the block which have a luminance value above that of the calculated average luminance component Yav, and from these pixels an upper luminance value Y1 is calculated as a function, such as the average, of the luminance values of those pixels which have a luminance value above that of Yav. Similarly, a count is taken of pixels which have a luminance value equal to or below that of the average luminance component Yav, and a lower luminance Y0 is calculated as a function, such as the average, of the luminance values for all pixels which have a luminance equal to or below the average luminance Yav. At the same time, a bit map representing the contour or shape information for pixels in the block is generated with the value of each bit (1 or 0) in the bit map representing either the Y1 or Y0 luminance value for the corresponding pixel in the block. More specifically, the bit map registers a logical "1" if the Y1 value represents the luminance of the pixel, or a logical "0" if the Y0 value represents the luminance value for the pixel.

At step 102, a further degree of data compression is obtained by replacing the two distinct pairs of (R−Y) and (B−Y) chrominance components with a single pair of chrominance values $(R-Y)_{av}$ and $(B-Y)_{av}$ defined by the respective averages of the pair of chrominance values extracted earlier. In combination with the averaging effect of the normalization hardware (FIG. 1), this results in a replacement of the four pairs of chrominance components with a single pair of (R−Y) and (B−Y) values. At this point, the color information for the pixels in a block can be represented by using the calculated high and low values Y1 and Y0, respectively, of the luminance component along with the associated bit map in conjunction with the averaged color difference values $(R-Y)_{av}$ and $(B-Y)_{av}$. This encoded representation of the original data requires the storage of only 6 bytes (48 bits) of information for the block as compared to the original 24 bytes, for a compression factor of 4 to 1.

The succeeding steps 103-106 further reduce the amount of information to be stored per block of encoded data to an ultimate 16 bits per block for a mosaic image. Step 103 calculates a representative luminance component Ym for the block, with a value between the two values Y0 and Y1. In the preferred embodiment, the representative luminance component Ym is calculated as an 8-bit value defined by the midpoint between the upper luminance value Y1 and the lower luminance value Y0.

At the next step 104, a differential or delta luminance value $\Delta Y$ is calculated as an 8-bit value representing the variation in luminance value with respect to the median luminance value Ym for pixels within the block to be encoded. In the preferred embodiment, the value $\Delta Y$ is calculated as the difference between the median value Ym and either Y1 or Y0 for that block. At this stage the encoding of the picture information, which includes both color and shape information for a block, still requires storage of: (i) 8-bit values each for the median luminance component Ym, the delta luminance component $\Delta Y$, the $(R-Y)_{av}$ color difference value and the $(B-Y)_{av}$ color difference value, amounting to a total of 32 bits per block for representing the color information; and (ii) 16 bits of information for the bit map for representing the shape information.

These 48 bits of information per block can be split into two groups: (i) a first set of 24 bits comprising a single byte of data representing each of the Ym, $(R-Y)_{av}$ and $(B-Y)_{av}$ values; and (ii) a second set of 24 bits comprising the single byte of data representing the $\Delta Y$ component and the two bytes of data representing the bit map associated with the block. The first set of data represents sufficient information which, when transmitted to the decoder, can be used to reproduce the encoded image in a mosaic form as described above. The second set of data represents additional information, which can subsequently be sent to the decoder in order to refine the mosaic image.

Returning now to FIG. 2, at step 105, the less significant portion of the data representing the color information for the block being encoded is selectively truncated. According to a feature of this invention, only a selected number of significant bits for the luminance value Ym and the color difference values $(R-Y)_{av}$ and $(B-Y)_{av}$ are actually made part of the data word that represents the mosaic color information for the block in consideration. The choice of the number of significant bits used to represent the median luminance component Ym and the averaged chrominance components $(R-Y)_{av}$ and $(B-Y)_{av}$ in the final coded mosaic data word is made on the basis of the minimum amount of color information required to reproduce the original color image at a level of resolution that results in a crude yet easily discernible mosaic-like color image.

Figure 3A:
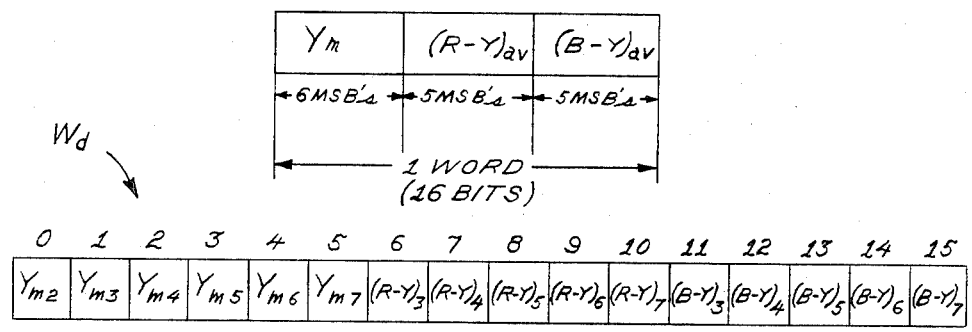
FIG. 3a is a representation of the color table format for use with the illustrative encoding scheme.

In the illustrative embodiment, the encoded mosaic data word includes only the six most significant bits of the 8-bit median luminance component value Ym and the five most significant bits of each of the 8-bit averaged chrominance components $(R-Y)_{av}$ and $(B-Y)_{av}$. A detailed representation of the actual encoded mosaic data word Wd is shown in FIG. 3a; this one 16-bit word Wd represents the basic picture information for the block being encoded. This word consists of the upper 6 bits Ym2, Ym3, Ym4, Ym5, Ym6 and Ym7 of the median luminance component Ym, the upper 5 bits $(R-Y)_3$, $(R-Y)_4$, $(R-Y)_5$, $(R-Y)_6$ and $(R-Y)_7$ of the $(R-Y)_{av}$ chrominance component, and the upper 5 bits $(B-Y)_3$, $(B-Y)_4$, $(B-Y)_5$, $(B-Y)_6$ and $(B-Y)_7$, of the $(B-Y)_{av}$ chrominance component (see FIG. 3a). These values define a fractional color volume which contains the color for one block of the image being encoded.

Figure 3B:
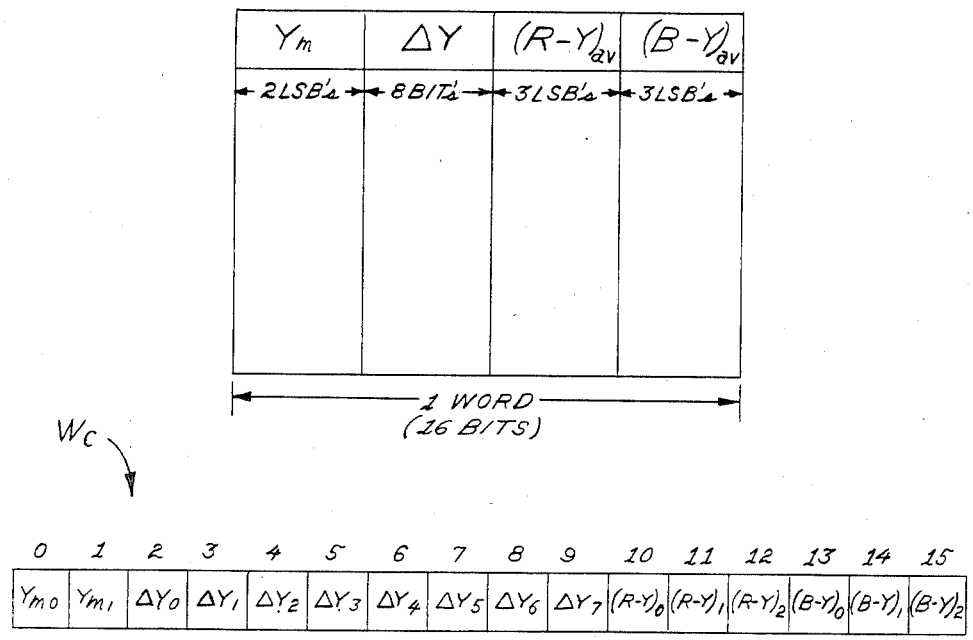
FIG. 3b is a representation of the encoded data format according to this invention.

At step 106, the rest of the color information, which includes information on the subtle shades of color and their variation within the fractional color volume represented by the mosaic data word Wd, is stored in the specially formatted RSVP color table along with the differential luminance component $\Delta Y$. Thus the RSVP color table is formatted to contain the lower 2 bits of the median luminance component Ym, the 8-bit delta luminance component $\Delta Y$, and the lower 3 bits of each of the averaged color difference signal values $(R-Y)_{av}$ and $(B-Y)_{av}$. As shown in FIG. 3b, this 16-bit data word Wc comprises the lower 2 bits $Ym_0$ and $Ym_1$ of the median luminance component Ym, all the 8 bits $\Delta Y_0$, $\Delta Y_1$, $\Delta Y_2$, $\Delta Y_3$, $\Delta Y_4$, $\Delta Y_5$, $\Delta Y_6$ and $\Delta Y_7$ of the delta luminance component $\Delta Y$, the lower 3 bits $(R-Y)_0$, $(R-Y)_1$ and $(R-Y)_2$ of the $(R-Y)_{av}$ chrominance component, and the lower 3 bits $(B-Y)_0$, $(B-Y)_1$ and $(B-Y)_2$ of the $(B-Y)_{av}$ chrominance component.

The one-word encoded mosaic data word Wd provides sufficient information for initially reproducing the original image in a low resolution form. Subsequently the RSVP color table information can be sent to the decoder, and the mosaic data word Wd can be used as a pointer or address into the RSVP color table to extract the corresponding RSVP color value Wc stored therein and upgrade the picture information to the desired degree of resolution.

For any given block of the color image, the RSVP color values stored within the color table in combination with the corresponding contour bit map and mosaic data word stored in the encoded image data provide sufficient information for reproducing the original color image in all its finer detail. A large degree of data compression results since only that data representing significant portions of the original color image is initially encoded and transmitted. The remaining information, pertaining to the finer details of the image, is stored separately and transmitted only when increased resolution or upgrading of the decoded image is desirable. Such an arrangement also permits control over the degree of color resolution at the image reproduction stage by regulating the amount of information sent to and retrieved from the RSVP color table. The only data that has to be stored within the storage file unit 26 (FIG. 1) is the 16-bit encoded mosaic data word Wd, the color table with 16-bit RSVP color values and the contour bit maps generated during encoding.

In forming the color table during the process of encoding, there may be a plurality of blocks that are represented by the same most significant bits of the luminance and chrominance components that form the encoded mosaic data word Wd, although the remaining less significant bits of the luminance, delta luminance and/or chrominance values, may be different. According to a feature of this invention, further data compression is accomplished by calculating average values of the luminance, delta luminance and chrominance components of all the blocks having the same encoded data word Wd within a particular image or field and storing only the resulting averaged values in the color table. An increased degree of compression of data is thus achieved without the loss of significant color information.

The color information represented by the mosaic data word Wd for a given block constitutes a fractional color volume within the universal color volume which includes the full range of possible luminance and chrominance components for a color image. The color information represented by the corresponding RSVP color value stored in the color table further defines a specific hue or color difference value within the various possible hues encompassed by the fractional color volume.

The process of averaging all the Wc values corresponding to a common Wd value averages all the separate hues of color that fall within a fractional color volume. Although this averaging process destroys a finite amount of color information, the loss is not significant because the average value still represents a hue of color located within the fractional color volume defined by the data word Wd for any given block. Since the fractional color volumes defined by the mosaic data words Wd are quite small, no significant color error is introduced no matter where the average value falls within that fractional color volume.

At the encoder end, the color table includes a large number of locations for storing RSVP color values corresponding to the mosaic data words Wd of the color image being encoded. However, it is not necessary to transmit all these values each time encoded image data is sent to the decoder. According to a feature of this invention, efficiency of transmission is improved by transmitting only the new values within the color table for a particular frame as compared to the previous frame. These new values may be due to changes between successive frames of a moving video image, or the acquisition of a totally new image such as occurs in the transmission of still-frame images or in initialization of the system.

The color table has associated with it a specific color table bit map for identifying the status of all locations of RSVP color values. The color table bit map registers a logical 1 if the color information in a given location of the color table is to be transmitted along with the encoded data words; otherwise it registers a logical 0. At the decoder end, the color table bit map is received first along with the RSVP color values and gives an indication of which color table locations in the previously defined color table are having new color values transmitted to them. This prepares the decoder to accept the transmitted color values for the identified locations and then store them within their respective positions within the color table.

The color table bit map allows the system to function by the transmission and reception of only the RSVP color values which are new thereby avoiding the need for transmission and reception of color values which remain the same. At the encoder end, the system compares the color tables for successive frames of the color image, identifies the particular RSVP color values which need to be transmitted and their color table locations, sends out the color table bit map identifying the color table locations for the values to be transmitted, and finally sends out the RSVP color values themselves. At the decoder end, the color table bit map identifies the locations within the color table where the transmitted RSVP color values are to be stored.

Figure 4:
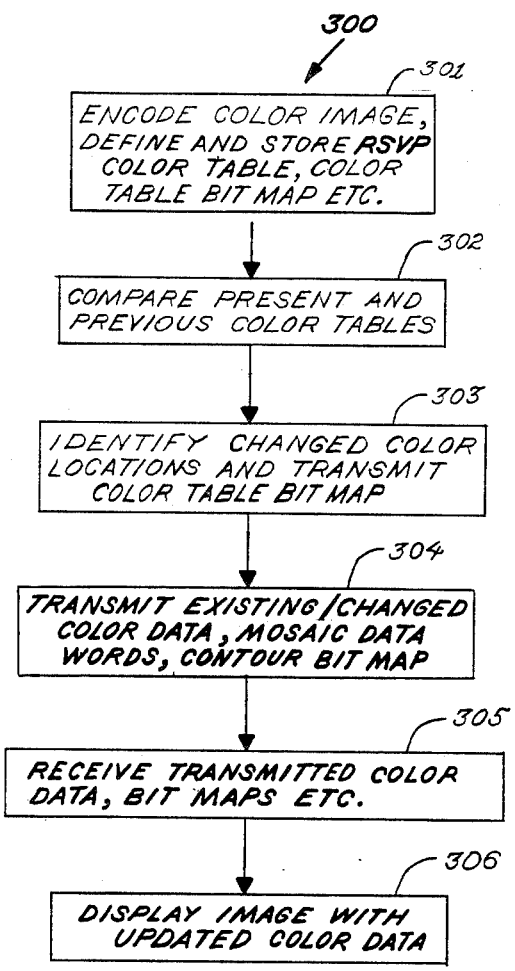
FIG. 4 is a flowchart representation of the sequence of events comprising the basic decoding scheme of the present invention.

This process is illustrated in FIG. 4 which is a flow diagram 300 of the operating sequence involved in such a selective transmission arrangement.

At step 301 the color image is encoded on the basis of the procedure outlined above, and the resulting encoded image data, the RSVP color table and the associated color table bit map are stored temporarily in memory. At step 302, a comparison is made between the color table defined for the image frame currently under consideration and the color table defined for the immediately preceding image frame. At step 303, the results of the comparison are used to identify the color table locations where the RSVP color values are new and hence need to be transmitted in order to update the color table already existing at the decoder. Also at step 303, the identified locations are transmitted to the decoder in the form of the color table bit map which specifies the locations for which new color information will be transmitted.

Subsequently, at step 304, all the new RSVP color values are transmitted to the decoder. Also included at the time of transmission, as previously shown in FIG. 2, are all the encoded image mosaic data words Wd and the contour bit maps for the current image frame.

Step 305 represents the reception stage where the new color information for the RSVP color table is received at the decoder and stored within the color table on the basis of the accompanying color table bit map. Finally, at step 306 the display system the decoder uses the encoded image data in conjunction with the updated color table information to display the encoded image.

According to another feature of the CODEC system, the quality of the reproduced picture is conveniently controlled by regulating resolution of the RSVP color values contained in the color table to generate the final decoded picture. This is accomplished by limiting or extending the number of bits from the various components that are stored in the color table in correspondence with an encoded word. For instance, fewer than all 8 bits of $\Delta Y$ may be stored and then used to generate the decoded color image. As an example, the use of just 4 of the 8 bits representing $\Delta Y$ results in a picture of resolution that is acceptable for certain applications. While encoding, the calculated $\Delta Y$ values can be truncated down to a selected number of most significant bits before storing the values in the color table, resulting in enhanced data compression.

According to yet another feature of the CODEC system, the identification of specific locations in the color table is made convenient and significantly faster by the use of a bit map hierarchical approach. In this arrangement the color table bit map has a prescribed number of bits for each of multiple tiers. For example, the bit map may have 16 bits for each of four tiers, for a total of 64 bits. The combination of 16 bits from the first two tiers form 256 unique nodes, and a combination of two logical ones at any of these nodes causes the third tier to be accessed. Conversely, a logical zero from either the first or second tier, or from both the first and second tiers, at any of the first 256 nodes means that the third tier is not accessed via that node. In the third tier, the combination of the 16 third-tier bits from the bit map and the 256 nodes formed by the first and second tiers, forms 4,096 nodes. Here again, a combination of two logical ones at any of these nodes causes the fourth tier to be accessed.

In the fourth tier, the combination of the 16 fourth-tier bits from the bit map and the 4,096 nodes formed by the first three tiers, forms a total of 65,536 nodes. This is the same as the number of locations in the color table, and the combination of two logical ones at any one of these nodes causes the corresponding color table location to be accessed. This hierarchical approach provides an extremely efficient manner for designating the color table locations for which new values are to be transmitted.

Returning to FIG. 2, at step 107, the encoded mosaic data words, the contour bit maps for referencing the differential luminance components, the specially formatted RSVP color table and the color table bit map are stored for transmission to the decoder. This marks the end of the basic image encoding stage. Certain enhancements to the basic encoding stage will be described in detail below.

Figure 5:
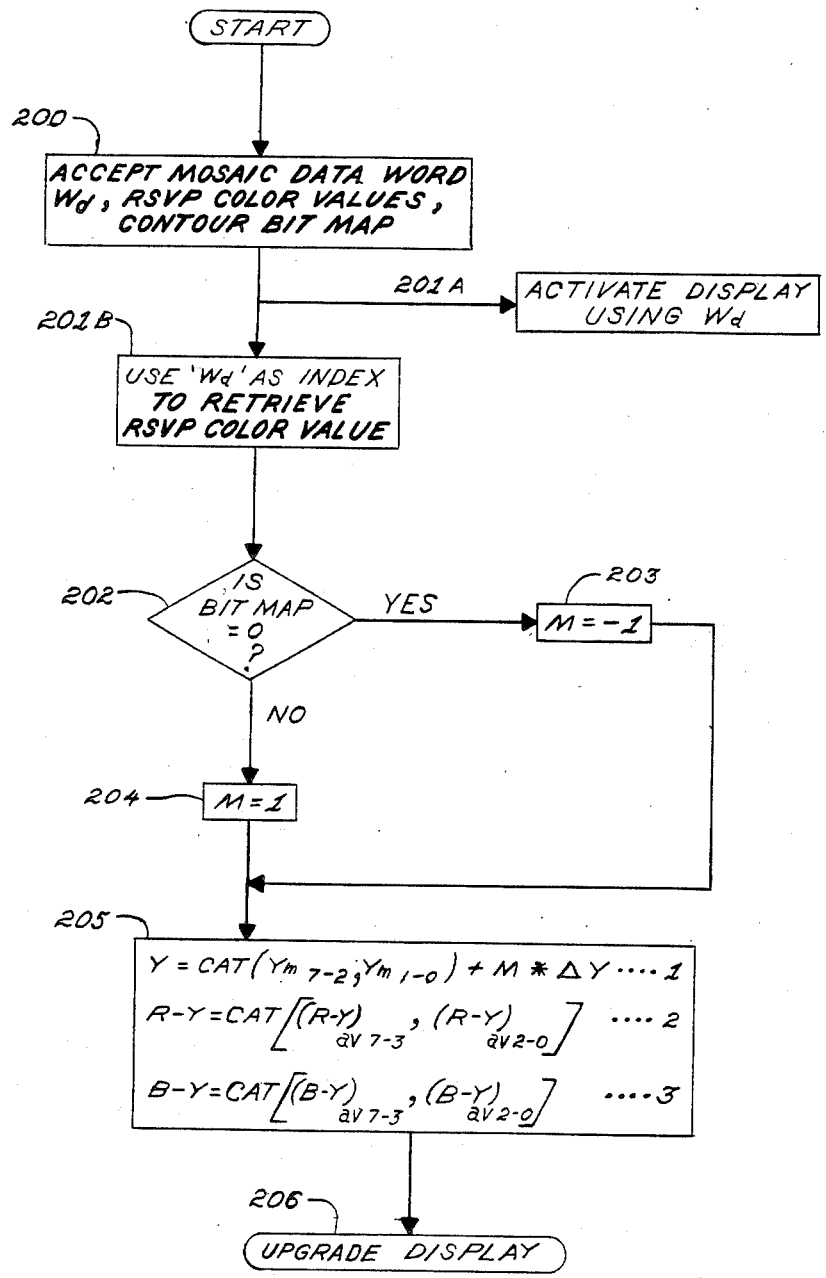
FIG. 5 is an illustration of the progressive multi-tier sectoring of the color table bit map according to this invention.

Referring now to FIG. 5, there is shown a simplified flow chart representation of the basic steps involved in the decoding process according to the CODEC system. The decoding begins at step 200 where the encoded mosaic data word Wd is accepted along with the associated contour bit map and the RSVP color values generated at the encoding stage. At step 201A, this coded mosaic data word Wd is initially used to generate the mosaic image described above. Subsequently, at step 201B the mosaic data word Wd is utilized as an address or pointer to retrieve the corresponding RSVP color value from the color table.

At step 202, the contour bit map accompanying the encoded mosaic data word is tested to determine how the $\Delta Y$ component contained in the RSVP color values is to be used in determining the overall luminance component for each pixel of the block being decoded. If the value of the contour bit map is found to be 0, an operator M is set to a value of $-1$ at step 203 before proceeding to the final calculation at stage 205. The total luminance value Y for this pixel is then calculated as the difference between (i) the value Ym defined by the concatenation of the six most significant bits of the luminance value from the encoded word and the two least significant bits of the luminance value from the retrieved RSVP color value and (ii) the delta luminance value $\Delta Y$ from the retrieved RSVP color value. On the other hand, if the value of the contour bit map is a logical 1, the operator M is set to a value of $+1$ at step 204 before accessing step 205, where the total luminance value Y for the pixel is then calculated as the sum of the value Ym and the delta luminance value $\Delta Y$.

In either of these cases (as represented by the contour bit map being either a logical 1 or a 0), the total color difference or chrominance components for the block are calculated in the same way. More specifically, the total $(R-Y)$ color difference for the block is defined as the concatenation of the five most significant bits of the $(R-Y)_{av}$ color difference value within the encoded mosaic data word and the two least significant bits of the $(R-Y)_{av}$ color difference value contained in the corresponding RSVP color value. Similarly, the total $(B-Y)$ color difference or chrominance component for the block is defined as the concatenation of the five most significant bits of the $(B-Y)_{av}$ color difference value within the encoded mosaic data word and the two least significant bits of the $(B-Y)_{av}$ color difference value contained in the corresponding RSVP color value.

At the end of step 205, the additional data that is needed to add detail to the crudely displayed color image (step 201A) is available and is used to upgrade the displayed color image at step 206. This concludes the basic image decoding stage. Certain enhancements to the basic encoding and decoding stages will now be described.

The illustrative CODEC scheme is made applicable to a variety of color image encoding and decoding applications with varying resolution requirements by allowing a plurality of modes suited to different levels of data compression. More specifically, a 2-bit compression mode identifier is associated with each encoded block with the four possible states of the identifier defining four discrete modes of encoding.

The first mode is applicable to cases where the block under consideration is found to be the same as the immediately preceding block, i.e., no changes are required in the data transmitted previously to the decoder. In such cases, the encoding process takes no further action, and the compression mode identifier indicates that the decoder should simply repeat the preceding block. This mode is equivalent to a conventional "NOP" mode.

The second compression mode represents a single-color mode for cases where the color image to be encoded has large areas of a single color with a constant luminance value Yav, and thus there is no need to compute the two luminance values Y0 and Y1. In such cases the blocks will comprise only a single color, precluding the need to transmit the delta luminance value and the contour bit map. In this single-color mode, the decoder is alerted to expect and receive only the data words identifying the single color for the block.

The third compression mode is applicable to cases where the existence of color variations within a block require the transmission of the encoded data word along with the bit map for the delta luminance values and the pertinent color table information. This is the mode described earlier in which the encoding process of the CODEC system generally operates.

The fourth compression mode is based upon the occasional need for maximum resolution in reproducing complex color video images with all their finer luminance details. In such cases, all the luminance information extracted from the composite video signal is transmitted to the decoder without subjecting it to any form of data compression. In effect, this is a non-destructive mode of operation as compared to the other modes since the original color image is reproduced in its entirety without any loss of detail. The non-destructive mode is particularly applicable to the reproduction of still images, such as X-ray pictures for medical analysis, where the finer details are of crucial importance.

A threshold level of permissible deviation from the original image as a result of encoding can also be built into the encoding system. For example, the CODEC system can be programmed to track the standard deviation of the original luminances as compared to the substituted Y0 and Y1 luminances at the encoding stage. The standard deviation serves as a measure of the error resulting from the encoding of the luminance information for a block. If this error is found to exceed a predetermined threshold value, the CODEC system can switch directly to the non-destructive mode so that all the acquired picture information is transmitted to the decoder to ensure high-resolution reproduction of the encoded color image.

According to yet another feature of the CODEC system, the standard operating mode as represented by the third compression mode can be adapted to the use of a contour coding approach for cases where an identifiable contour runs through a block of pixels. The contour coding approach uses histogramming techniques on a series of images in order to identify the most commonly occurring contour bit maps and sequentially stack them in a table of contour codes. Each of these encoded contours represents clusters of pixels having the same representative luminance value Y0 or Y1. In this mode, a new bit map is first tested to see if it reasonably matches one of the contour codes and, if so, the bit map is represented by a reduced number of bits constituting just the contour code for the matched contour instead of the complete bit map required to represent the shape information for the entire block. It will be understood that the encoded contour need not precisely match the predetermined and stored contours, i.e., the system may select the predetermined and stored contour which corresponds most closely to the actual contour encoded for the block.

The CODEC system is also designed to permit blending of operating modes under the block encoding modes in order to adapt the resolution of the process to localized variations in the color content of the image being encoded. Thus, different error thresholds may be prescribed for different modes of operation in order to determine, on the basis of a hierarchical test procedure, the most desirable mode of encoding and/or decoding for a particular image or even for particular portions of an image.

Figure 6:
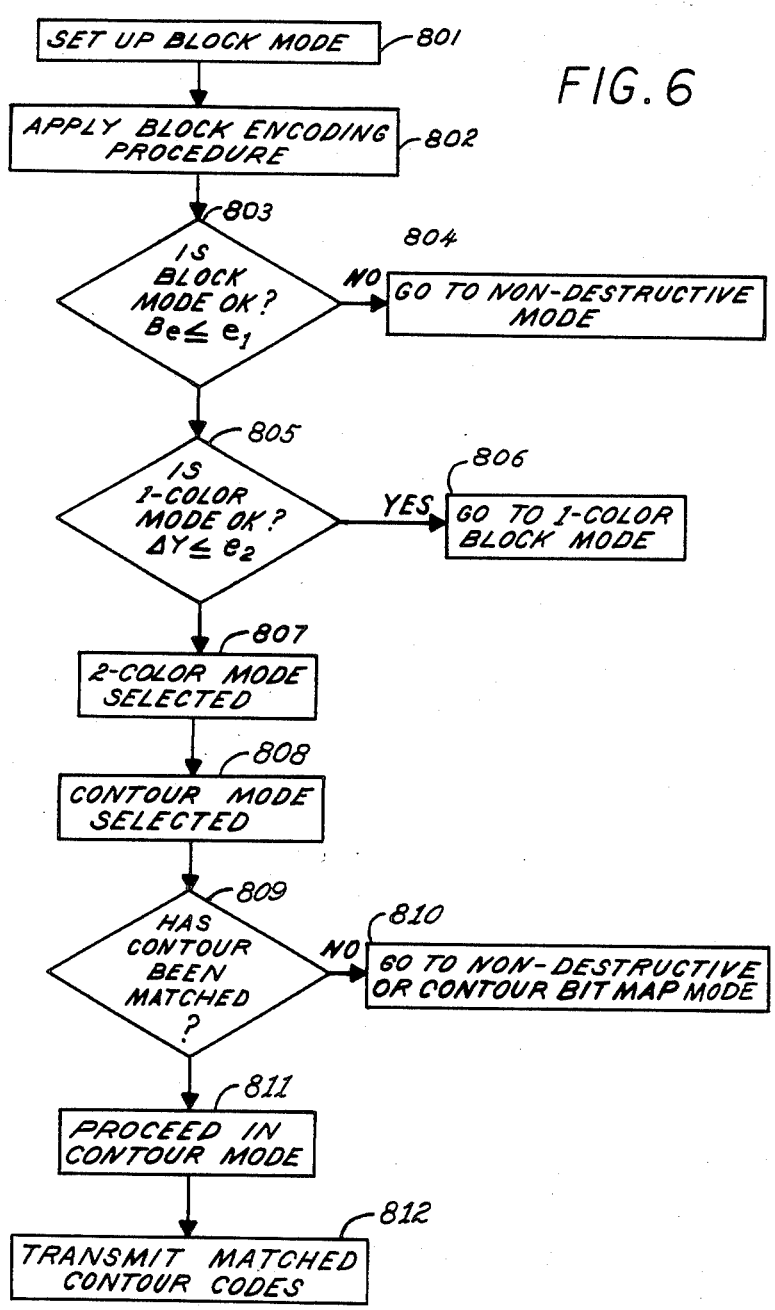
FIG. 6 is a simplified flow diagram of the operating sequence for the block mode hierarchical test procedure for blending of operating modes.

FIG. 6 is a simplified flow diagram representation of the sequence of operations involved in setting up the hierarchical test procedure under the block mode of operation that allows blending among the various operating modes. The initial steps of the sequence involve the selection of the block mode of operation (step 801) and the application of the block encoding procedure (step 802) described above in detail. At step 803, a check is made to determine whether the encoding error Be, as a result of applying the block encoding procedure, exceeds a predetermined threshold e1. The encoding error Be under the block mode of operation is preferably defined by the error equation:

$$Be = (Y0 - Ymin) + (Ymax - Y1) \tag{1}$$

In equation (1), Y0 and Y1 are the average luminance values calculated as part of the block encoding procedure, Ymin represents the lowest luminance value in the block and corresponds to the darkest pixel or pixels within the block, and Ymax represents the largest luminance value in the block and corresponds to the lightest pixel or pixels within the block.

The sum of the two error components (Y0−Ymin) and (Ymax−Y1) is one representation of the overall coding error for the block as a result of the various averaging steps used to achieve data compression during encoding. If the answer at step 803 is no, i.e., the block error Be exceeds the error threshold e1, step 804 is accessed to implement the non-destructive mode of operation.

The non-destructive mode of operation reproduces the original color image with a minimal loss of detail. This mode involves transmission of almost all the acquired picture information for a given block, and can be implemented in different ways. For instance, this mode can be based on the transmission of all luminance values for pixels within a block along with the associated pair of chrominance values. Alternatively, if contour coding is used and generates too much error, the contour bit map can be substituted for the contour code.

Regardless of the particular implementation, the availability of the non-destructive mode on a selective basis makes the process versatile and adaptable to localized color variations within the video image being encoded. The encoding operation is also enhanced because coding can proceed efficiently using block encoding until a block is encountered where the encoding error is excessive, in which case the system can automatically drop down into the non-destructive mode to reduce encoding error for that particular block before reverting to the block mode for encoding subsequent blocks of the image.

Returning to FIG. 6, if the answer at step 803 is yes, i.e., the block error Be is below the error threshold e1, it is an indication that the block mode of operation is suitable for the encoding procedure. The system then proceeds to step 805, where a check is made on the basis of another predetermined error threshold e2 to see if the encoding procedure may proceed in the single-color mode or the two-color mode. The comparison at step 805 is made on the basis of the ΔY value calculated at step 802 and which represents the median difference between the average luminance values Y1 and Y0 for pixels in the block. If ΔY is found to exceed the error threshold e2, the program proceeds with encoding the block using the single-color mode at step 806.

However, if the answer at step 805 is no, i.e., the error threshold e2 has not been exceeded, encoding is performed in the two-color mode at step 807. In the two-color mode, coding initially proceeds in the contour mode which is selected at step 808.

At step 809, a contour matching process is used to determine whether the encoded contour of the block under consideration matches (within prescribed limits) any one of the predetermined contours. If no matching contour is found, step 810 is accessed to proceed with the encoding procedure in either the non-destructive mode or the contour bit map mode, depending upon preprogrammed instructions.

If the contour matching process of step 809 yields an affirmative answer, the program proceeds in the contour mode (step 811) and the code for the matched contour is transmitted in place of the contour bit map at step 812. The predetermined contours are preferably represented by 8-bit contour codes, and thus the contour mode requires the transmission of only the 8-bit contour codes instead of the 16 bits of the contour bit map.

The CODEC system may use an adaptive resolution approach called sector coding to provide a further degree of control over the resolution with which the encoding of a color image and its subsequent reproduction at the decoder end occurs. The encoding process as well as the data transmission and decoding processes can be speeded up by defining a mode of operation in which encoding is done at a higher level of progression than the block level discussed above. For instance, a sector mode of operation may use sectors consisting of a group of four blocks. The information extraction is then performed over a sector, consisting of 8×8 pixels, by using an averaging approach which yields a pair of luminance components Y0 and Y1 and a pair of chrominance components $(R-Y)_{av}$ and $(B-Y)_{av}$ defining the color information for the sector. The rest of the encoding process described above is then applied to encode the color image on the basis of a sector instead of a block.

This mode of operation is more destructive since the averaging of image information occurs over a significantly increased area, thereby resulting in a lower degree of resolution at the decoder end. Such sector mode operation can be tied in with a threshold deviation or error limitation, such as a predetermined threshold of standard deviation of the original luminances as compared to the Y0 and Y1 luminances, so that the system initially starts operating in the sector mode and automatically zones down to the normal block mode if the deviation occurring as a result of the encoding process exceeds the specified error limit.

The use of the sector mode also assists in identifying the location of isolated changes within the picture image while extracting the color data, by using minimal data overhead. The image can be initially divided into segments consisting of sectors and secondarily of the blocks within each of the sectors and, subsequently, changes may be located by progressively identifying first the sector and next the block within which the change occurs and using a bit map hierarchical approach to track the identified sectors and blocks.

Figure 7:
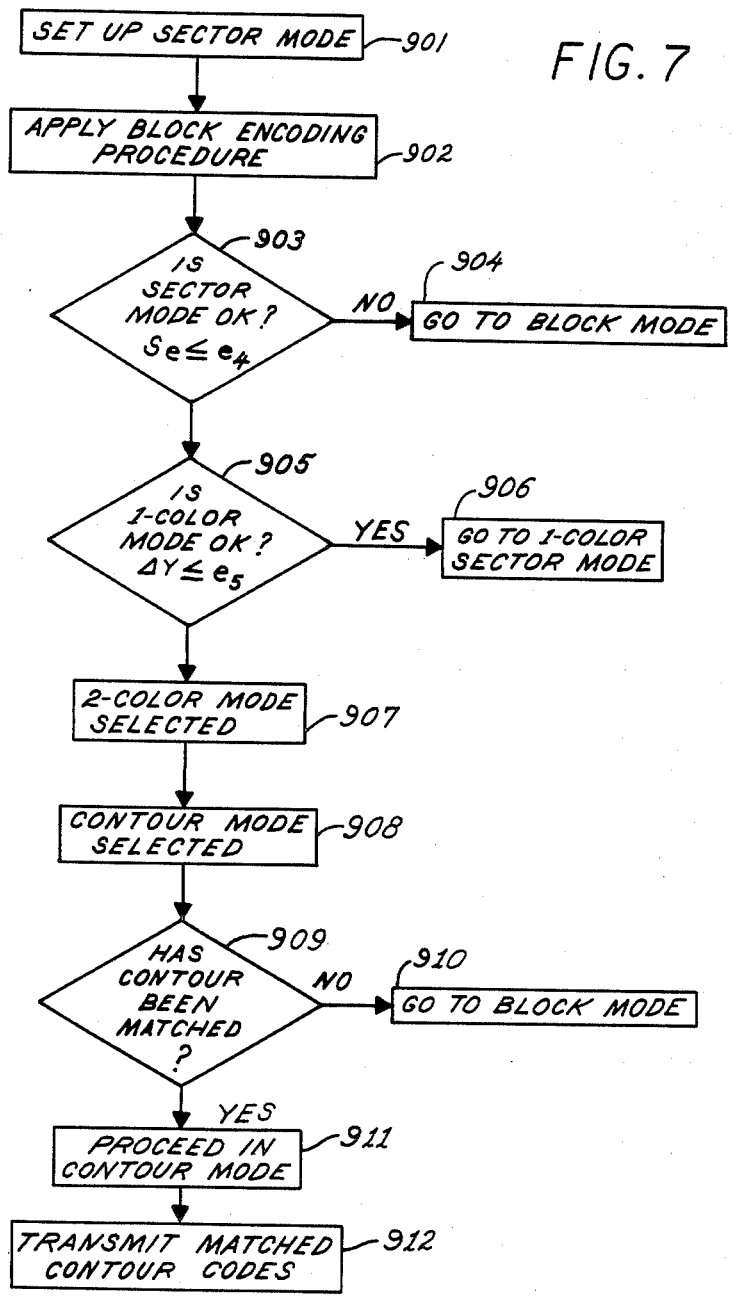
FIG. 7 is a flow diagram representation of a similar operating sequence used with the sector mode of operation.

Referring now to FIG. 7, there is shown a flow diagram of the sequence of operations involved in a test procedure that allows blending between operating modes under the sector mode of operation. The initial step in FIG. 7 (step 901) involves the selection of the sector mode in which encoding is done at a substantially higher level of progression as compared to the block mode. In this the sector mode, every four adjoining pixels are combined or averaged together to form one "super" pixel. A sector is derived from the merger of four adjoining blocks and, after the averaging process has been performed, the sector data is similar to data representing a block so that the color and shape information extraction and the rest of the encoding procedure for the block mode of operation is applicable to all encoding in the sector mode of operation.

Thus, at step 902, the block encoding procedure is applied to the sector under consideration. At step 903, a check is made to determine whether the coding error Se generated as part of the encoding procedure within the sector mode of operation exceeds a predetermined error threshold e4. The sector coding error Se is based upon the same error equation (1) used for determining the block coding error at step 803 in FIG. 6. If the sector coding error Se is found to exceed the error threshold e4, step 904 is accessed to proceed with the encoding procedure under the block mode of operation.

An important addition to the checking process for sector mode is to include the error due to the averaging of the four chrominance pairs associated with the four blocks in a sector. Although the human visual system generally is not sensitive to gradients in chrominance, as opposed to luminance, when a 4×4 block of pixels is used, the use of a 8×8 sector of pixels can make the viewer sensitive to gradients in both chrominance and luminance. Optionally, sector mode could always transmit all four chrominance pairs, although this would increase the amount of encoded data.

If the sector error Se is found to be within the limits defined by the error threshold e4, step 905 is accessed where a check is made to determine whether coding may proceed in the single-color mode. As in the case of the block mode, error comparison is made on the basis of the ΔY value which, in the sector mode, represents the median difference between the average luminance values Y1, Y0 for the "super" pixels within the sector under consideration. If this ΔY value is found to be within bounds defined by a predetermined error threshold e5, step 906 is accessed to encode the sector using the single-color mode. If the answer at step 905 is no, i.e., the error threshold e5 is found to have been exceeded, the two-color mode is selected at step 907.

Coding then proceeds in the contour mode which is selected at step 908. Subsequently, at step 909, the contour matching process (described above) is used to test for the existence of a match between the contour defined for the sector and a series of predefined contours. If no matching contour is found, step 910 is accessed and the program proceeds with the encoding procedure in the block mode of operation. If a positive match is found at step 909, the program proceeds within the contour mode (step 911) and at step 912 the 8-bit contour code representing the matched contour is transmitted in place of the bit map for the sector being encoded.

The choice of the various error thresholds is made on the basis of the desired degree of resolution required for any given application. These error thresholds can be used to force the encoding procedure to operate under a particular mode of operation. For example, in the case of applications which do not require high resolution, the sector mode of operation may be forced at all times by setting the error threshold e4 to an extremely high value. This results in an extremely low-resolution reproduction of the original image, but allows higher encoding, transmission, and decoding speeds. Similarly, for applications requiring extremely high resolution, the encoding procedure can be forced to always operate in the non-destructive mode by setting the error threshold e1 to an extremely low value. The above arrangement thus provides a conveniently adjustable resolution system which the user may vary according to his particular application.

The decoder requires information defining the particular mode in which the encoding system is functioning in order to ensure proper reception of all the picture information transmitted from the encoder. This is accomplished by transmitting a preamble code prior to the transmission of the actual data to the decoder. The preamble code can be used not only to distinguish between the non-destructive and destructive modes of of the CODEC system, but also to identify the transmission of various other types of information such as digitized signals for accompanying audio or digitized alphanumeric data for teleconferencing purposes, etc., when the CODEC system is used in conjunction with other integrated communication systems.

Since the system of this invention allows blending of various modes within the sector and block modes of operation in order to provide varying degrees of resolution over localized portions of an image, it is possible that a reproduced image may include color steps or boundaries in areas where adjoining blocks are reproduced at sharply differing degrees of resolution. For example, an image may include an area reproduced on the basis of single-color encoding adjacent an area reproduced on the basis of two-color contour encoding. At the common boundary of these areas, an artificial boundary or transition is created because of the blending effect and gives the reproduced image a gritty or blocky appearance. This problem is solved by using a logical filtering process in the decoder which averages the color information for pixels located at the boundary or common perimeter of the adjacent areas in which the transition is likely to exist.

The filtering process operates in such a way that the pixels at the common boundary or transition portion of the identified areas are averaged to smooth out the boundary. The error thresholds are used to define the extent to which a transition or step between adjoining areas is to be attributed to genuine steps or steps produced as a result of blending. If the step exceeds a threshold limit of change, it is treated as a genuine step and the filter ignores it. If the step is within the threshold, the logical filter averages the boundary pixels to eliminate the step and smoothen the image. It should be apparent that no filtering is required in the non-destructive mode as all steps or transitions are genuine portions of the image.

This filtering process may be performed either before the received color information is actually displayed from the display memory using hardware, or the smoothing may be done while the received image is being displayed by scanning the display memory using software, identifying any existing steps or boundaries, and then smoothing them out.

The illustrative digital CODEC system can be adapted to applications requiring the encoding and subsequent reproduction of printed text matter by using the non-destructive mode of operation with a limited number of grey level luminance values, and no chrominance information since chrominance values are not needed in monochrome applications. For instance, the text may be subject to a preprocessing filter which normalizes the original text image by assigning a single normalized "white" value to all pixels in a block having various shades of white and a single normalized "black" value to all pixels having various shades of black and then assigning a predefined number of grey levels in between the "white" and "black" values for use in the actual encoding process. This type of preprocessing produces the high degree of data minimization required in text encoding operations which are normally subject to a high degree of grey level fluctuation arising from noise produced by variations in the illumination signal intensity as the text matter is being imaged. The CODEC system can be used to complement the operation of conventional optical character readers (OCR's) which can efficiently operate upon the text matter after it has been encoded according to the above process.

As is apparent from the foregoing description, the digitizing CODEC system of this invention is extremely versatile, and provides simple and convenient compression-encoding and expansion-decoding means, while at the same time providing the capability of conveniently controllable multiple levels of compression, thereby making it applicable to a variety of applications.

What is claimed is:

1. A color video image acquisition and compression process for encoding and decoding color images, said process comprising the steps of:
    acquiring digital data representing luminance and chrominance components of a color video image,
    dividing the digital data representing the color video image into data sets representing blocks of the color image, each block containing a plurality of pixels each of which has a luminance value Y and a plurality of chrominance values,
    calculating the average luminance value Yav for all pixels in the block,
    determining a representative luminance value Y1 within a range extending between the maximum and average luminance values of pixels having luminance values above the average value Yav in each block, and determining a representative luminance value Y0 within a range extending between the minimum and average luminance values of pixels having luminance values below the average luminance value Yav in each block,
    generating picture shape information for each of said blocks by identifying and encoding a contour associated with said representative luminance values Y0 and Y1, said contour representing clusters of pixels having the same representative luminance value Y0 or Y1,
    comparing said encoded contour for each block with a series of predetermined encoded contours and selecting the predetermined encoded contour which corresponds most closely to the actual contour encoded for the block,
    transmitting to a decoder encoded data comprising said representative luminance values Y1 and Y0, corresponding chrominance values, and the selected predetermined encoded contour for each block, and
    decoding the transmitted data to reproduce the original color image.

2. The process of claim 1 which includes the step of calculating at least one representative pair of chrominance values for each block.

3. The process of claim 1 wherein said chrominance values comprise at least one set of red, blue and green values for each block.

4. The process of claim 1 which includes the steps of
    calculating a first measure of error resulting from the encoding of the luminance information for a block,
    determining whether said first error exceeds a first predetermined threshold value, and
    if said first error exceeds said first threshold value, transmitting to said decoder all said luminance values Y for that block to produce a higher resolution reproduction of that portion of the original image.

5. The process of claim 4 which includes the steps of
    processing the luminance information for a block to produce a bit map capable of reproducing that portion of the original image with a higher resolution than said encoded contour but a lower resolution than all said luminance values for that block, said bit map corresponding to the array of pixels within a block and representing partial luminance information for the different pixels,
    if said first measure of error does not exceed said first threshold value, calculating a second measure of error resulting from the encoding of the luminance information for a block,
    determining whether said second error exceeds a second predetermined threshold value, and
    if said second error exceeds said second threshold value, transmitting to said decoder said encoded luminance data.

6. A digital color video image encoding and decoding process comprising the steps of:
    dividing digital data representing the overall color information for a video image into sets of data representing color information for blocks of the image, separating each color-information data set into (i) a first sub-set of encoded data representing sufficient luminance and chrominance information to permit a mosaic reproduction of the original image, (the "mosaic data"), said mosaic data including a representative luminance value for an entire block, and (ii) a second sub-set of encoded data representing additional luminance information to permit the original image to be reproduced with a greater degree of color resolution than said mosaic reproduction (the "high-resolution data"), said high-resolution data being stored in a color table, said mosaic data being used as the address of the color table location containing the corresponding high-resolution data, transmitting and decoding said mosaic data to display a mosaic reproduction of the original image, and periodically transmitting and decoding said high-resolution data to display a reproduction of the original image with a greater degree of color resolution than said mosaic reproduction.

7. The process of claim 6 wherein all the high-resolution data having a common address in the color table is averaged to compress the amount of data stored in the color table.

8. The process of claim 6 wherein said high-resolution data includes a bit map corresponding to the array of pixels within a block and representing partial luminance information for the different pixels.

9. A digital color video image encoding and decoding process comprising the steps of:

dividing digital data representing the overall color information for a video image into sets of data representing color information for blocks of the image, separating each color-information data set into (i) a first sub-set of encoded data representing sufficient luminance and chrominance information to permit a mosaic reproduction of the original image, (the "mosaic data") said mosaic data including a representative luminance value for an entire block, said value representing the most significant chrominance information for the block, and (ii) a second sub-set of encoded data representing additional luminance informawtion to permit the original image to be reproduced with a greater degree of color resolution than said mosaic reproduction (the "high-resolution data") said high-resolution data including the least significant chrominance information for a block, transmitting and decoding said mosaic data to display a mosaic reproduction of the original image, and periodically transmitting and decoding said high-resolution data to display a reproduction of the original image with a greater degree of color resolution than said mosaic reproduction.

10. A digital color video image encoding and decoding process comprising the steps of:

dividing digital data representing the overall color information for a video image into sets of data representing color information for blocks of the image, separating each color-information data set into (i) a first sub-set of encoded data representing sufficient luminance and chrominance information to permit a mosaic reproduction of the original image, (the "mosaic data"), said mosaic data including a representative luminance value for an entire block, and (ii) a second sub-set of encoded data representing additional luminance information to permit the original image to be reproduced with a greater degree of color resolution than said mosaic reproduction (the "high-resolution data"), said high-resolution data including information for determining a representative luminance value Y0 within a range extending between the maximum and average luminance values of pixels having luminance values above the average value Yav in each block, and for determining a representative luminance value Y1 within a range extending between the minimum and average luminance values of pixels having luminance values below the average luminance value Yav in each block; and information representing the contour of said Y0 and Y1 values within a block, transmitting and decoding said mosaic data to display a mosaic reproduction of the original image, and periodically transmitting and decoding said high-resolution data to display a reproduction of the original image with a greater degree of color resolution than said mosaic reproduction.

11. A color video image acquisition and compression process for encoding color images, said process comprising the steps of:

acquiring digital data representing luminance and chrominance components of a color video image, dividing digital data representing a color video image into data sets representing blocks of the color image, each block containing a plurality of pixels each of which has a luminance value Y and a plurality of chrominance values, calculating the average luminance value Yav for all pixels in the block, determining a representative luminance value Y1 between the maximum and average luminance values of pixels having luminance values above the average value Yav in each block, and determining a representative luminance value Y0 between the minimum and average luminance values of pixels having luminance values below the average luminance value Yav in each block, calculating a median luminance value Ym midway between said values Y0 and Y1 for each block, calculating the difference $\Delta Y$ between Ym and Y0 or Y1, and generating picture shape information for each block.

12. The process of claim 11 which includes the steps of transmitting and decoding Ym and the chrominance information for each block to display a mosaic reproduction of the original image in each frame, and transmitting and decoding the bit map, $\Delta Y$ and any remaining portions of Ym and the chrominance information for each block to display a high-resolution reproduction of the original image in selected frames.

13. The process of claim 11 wherein said picture shape information comprises an encoded contour.

14. The process of claim 11 wherein said picture shape information comprises a bit map in which each bit corresponds to one of the pixels in the array of pixels within a block, the value of each bit representing either a Y0 or Y1 value for each pixel.

15. The process of claim 11 further comprising the steps of:

calculating a measure of deviation between said pixel luminance values and said representative luminance values Y1 or Y0 for each block, comparing said measure of deviation with a predefined threshold value, and if said measure of deviation exceeds said predefined threshold value, dividing each block into two or more smaller blocks.

16. The process of claim 11 which includes the steps of:

calculating a single pair of representative chrominance values for each Ym, utilizing a selected number of the most significant bits of Ym and said chrominance values to represent a fractional color volume, utilizing said fractional color volume representation as an address in a color table, storing at said address in a color table the value of ΔY and the remaining least significant bits of Ym and said chrominance values for each of said blocks, said stored values representing the luminance and chrominance positions within said fractional color volume for said block, transmitting to a decoder said fractional color volume representations and the values stored in corresponding locations of the color table, using said transmitted fractional color volume representations table for each of said blocks as an index into said transmitted color table to retrieve the values stored therein, combining, according to a predetermined relationship, each of said fractional color volume representations with the corresponding values retrieved from said color table, and using said combined values to reproduce the luminance and chrominance components of the original image.

17. The process of claim 11 wherein said picture shape information includes a contour bit map corresponding to the pixels in each block, said contour bit map having a value of 1 for pixels having a luminance value above said average luminance value Yav and a value of 0 for pixels having a luminance value below said average luminance value Yav.

18. The process of claim 16 wherein said decoder is used to display a mosaic of the original image by using only said fractional color volume representations transmitted to said decoder.

19. A digital color video image encoding and decoding process comprising the steps of:

acquiring digital data representing luminance and chrominance components of a color video image, dividing digital data representing the overall color information for a video image into sets of data representing color information for blocks of the image, separating each color-information data set into (i) a first sub-set of encoded data representing sufficient luminance and chrominance information to permit a mosaic reproduction of the original image, (the "mosaic data"), said mosaic data including a representative luminance value for an entire block, and (ii) a second sub-set of encoded data representing additional luminance information to permit the original image to be reproduced with a greater degree of color resolution than said mosaic reproduction (the "high-resolution data"), storing said high-resolution data in a color table memory having addresses represented by said mosaic data so that said mosaic data can be used to identify the color table location containing the corresponding high-resolution data.

transmitting and decoding said mosaic data to display a mosaic reproduction of the original image, and periodically transmitting and decoding said high-resolution data to display a reproduction of the original image with a greater degree of color resolution than said mosaic reproduction.

20. The process of claim 19 wherein all the high-resolution data having a common address in the color table is averaged to compress the amount of data stored in the color table.

21. The process of claim 19 wherein said data stored in the color table for blocks of the image being encoded is compared to the corresponding data stored in the color table for the preceding encoded image, and only the data for blocks which have new values is selected for transmission to the decoder.

22. A color video image acquisition and compression process for encoding and decoding color images, said process comprising the steps of:

acquiring digital data representing luminance and chrominance components of a color video image, dividing the digital data representing the color video image into data sets representing blocks of the color image, each block containing a plurality of pixels each of which has a luminance value Y and a plurality of chrominance values, calculating the average luminance value Yav for all pixels in the block, determining a representative luminance value Y1 within a range extending between the maximum and average luminance values of pixels having luminance values above the average value Yav in each block, and determining a representative luminance value Y0 within a range extending between the minimum and average luminance values of pixels having luminance values below the average luminance value Yav in each block, generating picture shape information for each of said blocks, calculating a first measure of error between the original luminance values of the pixels in a block and said representative luminance values Y0 and Y1, determining whether said first error exceeds a first predetermined threshold value, transmitting to a decoder encoded data comprising said representative luminance values Y1 and Y0, corresponding chrominance values, and the picture shape information for each block, and if said first error exceeds said first threshold value, transmitting to said decoder all said luminance values Y for that block to produce a higher resolution reproduction of that portion of the original image, and decoding the transmitted data to reproduce the original color image.

23. The process of claim 22 wherein said picture shape information is generated by identifying and encoding a contour for each block, and which includes the additional steps of processing the luminance information for a block to produce encoded luminance data capable of reproducing that portion of the original image with a higher resolution than said encoded contour but a lower resolution than all said luminance values for that block, if said first measure of error does not exceed said first threshold value, calculating a second measure of error resulting from the encoding of the luminance information for a block, determining whether said second error exceeds a second predetermined threshold value, and if said second error exceeds said second threshold value, transmitting to said decoder said encoded luminance data.

24. The process of claim 22 which includes the step of calculating at least one representative pair of chrominance values for each block.

25. The process of claim 22 wherein said chrominance values comprise at least one set of red, blue and green values for each block.

26. A color video image acquisition and compression process for encoding and decoding color images, said process comprising the steps of:

acquiring digital data representing luminance and chrominance components of a color video image, dividing the digital data representing the color video image into data sets representing sectors of the color image, each sector containing a plurality of blocks of pixels each of which has a luminance value Y and a plurality of chrominance values, calculating the average luminance value Yav for all pixels in the sector, determining a representative luminance value Y1 within a range extending between the maximum and average luminance values of pixels having luminance values above the average value Yav in each sector, and determining a representative luminance value Y0 within a range extending between the minimum and average luminance values of pixels having luminance values below the average luminance value Yav in each sector, generating representative chrominance values for each of said sectors, generating picture shape information for each of said sectors, calculating a measure of error between the color values of the pixels in a sector and said representative luminance or chrominance values, determining whether said error exceeds a predetermined threshold value, if said error is below said threshold value, transmitting to a decoder encoded data comprising luminance values, chrominance values, and picture shape information for that sector, if said error exceeds said first threshold value, dividing the digital data representing the color video image into data sets representing blocks of the color image, each block containing a plurality of pixels each of which has a luminance value Y and a plurality of chrominance values, calculating the average luminance value Yav for all pixels in the block, determining a representative luminance value Y1 within a range extending between the maximum and average luminance values of pixels having luminance values above the average value Yav in each block, and determining a representative luminance value Y0 within a range extending between the minimum and average luminance values of pixels having luminance values below the average luminance value Yav in each block, generating representative chrominance values for each of said blocks, generating picture shape information for each of said blocks, transmitting to said decoder the block-encoded data comprising luminance values, chrominance values, and picture shape information for that block, and decoding the transmitted data to reproduce the original color image.

27. The process of claim 26 wherein said measure of error is representative of the error between the original luminance values of the pixels and said representative luminance values Y0 and Y1 for the sector.

28. The process of claim 26 wherein said measure of error is representative of the error between the original chrominance values of the pixels and said representative chrominance values of the sectors.

* * * * *